US008402075B2

(12) United States Patent
Oliver

(10) Patent No.: US 8,402,075 B2
(45) Date of Patent: Mar. 19, 2013

(54) MECHANISM FOR FAST DETECTION OF OVERSHIFT IN A FLOATING POINT UNIT OF A PROCESSING DEVICE

(75) Inventor: David S. Oliver, Longmont, CO (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1035 days.

(21) Appl. No.: 12/404,426

(22) Filed: Mar. 16, 2009

(65) Prior Publication Data

US 2010/0235416 A1 Sep. 16, 2010

(51) Int. Cl.
*G06F 7/38* (2006.01)
*G06F 7/42* (2006.01)

(52) U.S. Cl. ........ 708/501; 708/209; 708/490; 708/491; 708/505

(58) Field of Classification Search .................. 708/209, 708/490, 491, 501
See application file for complete search history.

(56) References Cited

U.S. PATENT DOCUMENTS

| | | | |
|---|---|---|---|
| 5,757,686 A * | 5/1998 | Naffziger et al. ............. | 708/501 |
| 5,796,644 A | 8/1998 | Jiang | |
| 6,381,624 B1 | 4/2002 | Colon-Bonet et al. | |
| 6,754,688 B2 * | 6/2004 | Pham et al. .................... | 708/505 |
| 6,947,962 B2 | 9/2005 | Hoskote | |
| 7,080,111 B2 | 7/2006 | Pangal et al. | |
| 7,444,366 B2 | 10/2008 | Thayer et al. | |
| 7,676,536 B1 * | 3/2010 | Purcell .......................... | 708/497 |
| 8,069,200 B2 * | 11/2011 | Landers et al. ............... | 708/501 |
| 8,214,417 B2 * | 7/2012 | Ahmed .......................... | 708/505 |

OTHER PUBLICATIONS

International Search Report in application No. PCT/US2010/026908 mailed Jun. 8, 2010.
Seidel, et al: "Delay-Optimized Implementation of IEEE Floating-Point Addition;" IEEE Transactions on Computers, vol. 53, No. 2, Feb. 2004, pp. 97-113, XP011106088.
Trong, et al: "P6 Binary Floating-Point Unit" IEEE Symposium on Computer Arithmetic 2007, Jun. 2007, pp. 77-86, XP031116328.
Anonymous: "Selective Prenormalization of Operands in Floating Point Processors;" IBM Technical Disclosure Bulleting, International Business Machines Corp., Thornwood, US, vol. 36, No. 12, Dec. 1993, pp. 693-695; XP000419115.

* cited by examiner

*Primary Examiner* — Tammara Peyton
(74) *Attorney, Agent, or Firm* — Meyertons Hood Kivlin Kowert & Goetzel; Stephen J. Curran

(57) ABSTRACT

A floating point unit includes a floating point adder to perform a floating point addition operation between first and second floating point numbers each having an exponent and a mantissa. The floating point unit also includes an alignment shifter that may calculate a shift value corresponding to a number of bit positions to shift the second mantissa such that the second exponent value is the same as the first exponent value. The alignment shifter may detect an overshift condition, in which the shift value is greater than or equal to a selected overshift threshold value. The selected overshift threshold value comprises a base 2 number in a range of overshift values including a minimum overshift threshold value and a maximum overshift threshold value, and which has a largest number of a consecutive of bits that are zero beginning at a least significant bit.

20 Claims, 3 Drawing Sheets

Right Shift Amount S: S[18:0] = ExpA[17:0] + ExpB[17:0] + ~ExpC[17:0] + Constant[17:0]
Define X & Y as:
X = ~S[18] & (S[17] | S[16] | S[15] | S[14] | S[13] | S[12] | S[11] | S[10] | S[9] | S[8])
Y = ~S[18] & S[7] & S[6] & (S[5] | S[4] | S[3] | S[2] | S[1])

Overshift Detection: (S[17:0] >= 194d)

Overshift Detection: (S[17:0] >= 256d)

MECHANISM FOR FAST DETECTION OF OVERSHIFT IN A FLOATING POINT UNIT OF A PROCESSING DEVICE

BACKGROUND OF THE INVENTION

1. Field of the Invention

This invention relates to processors and, more particularly, to floating point calculations within the processor.

2. Description of the Related Art

In computing systems, floating point numbers are numeric representations of rational numbers. Generally, the phrase "floating point" refers to the idea that the radix or decimal point may be moved anywhere in relation to the significant digits of the number. The position information may be separately indicated. There are a number of ways that floating point numbers have been represented, although the most prevalent standard is defined by the Institute of Electrical and Electronic Engineers (IEEE) 754 standard.

Floating point operations provide a distinct advantage over fixed point operations in that a floating point number can represent a far wider range of values. However, floating point operations can be slower to compute. Accordingly, the measure of the speed at which a computing system may perform floating point arithmetic operations is of prime concern when considering overall processor performance. Thus, when computing systems perform floating point arithmetic such as a multiply and add operation (FMA), detection of an "overshift" condition in as timely a manner as possible may be important. For example, when performing an FMA the addend must be shifted to align in significance with the product. To do so, the shift amount is calculated. As part of the calculation, detection of the overshift condition is in the critical path. In many conventional systems, a logic circuit may perform a compare operation between a constant and a right shift number. This comparison is in the critical timing path, and the number of gates to make the comparison can be large, thereby having a larger than acceptable timing path delay.

SUMMARY

Various embodiments of an overshift detection mechanism are disclosed. In one embodiment, a floating point unit such as may be used in a processor, for example, includes a floating point adder configured to perform a floating point addition operation between a first floating point number having a first exponent and a first mantissa, and a second floating point number having a second exponent and a second mantissa. The floating point unit also includes an alignment shifter that may calculate a shift value corresponding to a number of bit positions to shift the second mantissa such that the second exponent value is the same as the first exponent value. The alignment shifter may detect an overshift condition, in which the shift value is greater than or equal to a selected overshift threshold value. In addition, the alignment shifter may provide an overshift indication in response to detecting the overshift condition. The selected overshift threshold value comprises a base 2 number in a range of overshift values including a minimum overshift threshold value and a maximum overshift threshold value, and which has a largest number of a consecutive of bits that are zero beginning at a least significant bit.

Figure 1:
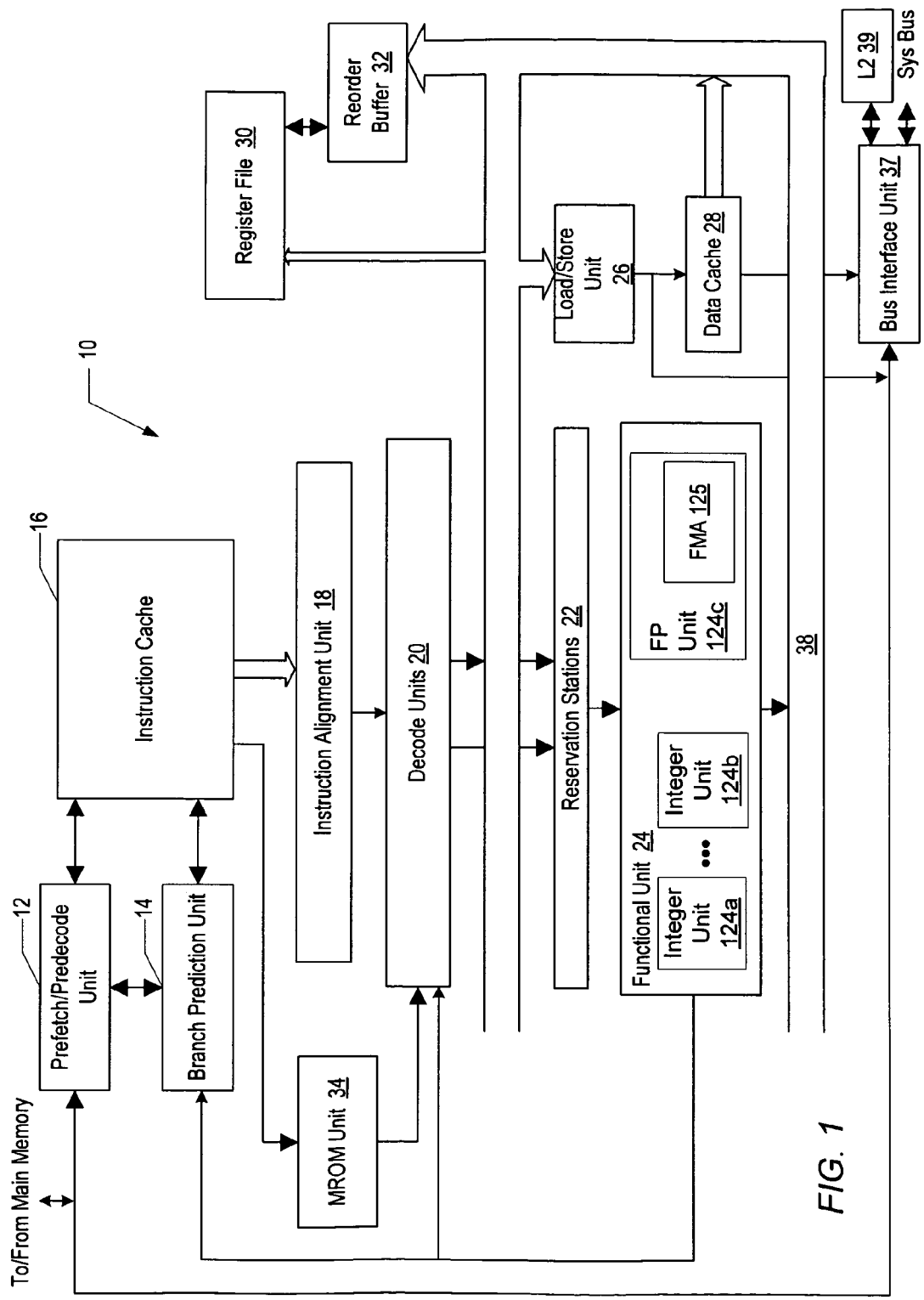
FIG. 1 is a generalized block diagram illustrating one embodiment of a general-purpose processor core.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. It is noted that the word "may" is used throughout this application in a permissive sense (i.e., having the potential to, being able to), not a mandatory sense (i.e., must).

DETAILED DESCRIPTION

Turning now to FIG. 1, a generalized block diagram of one embodiment of a processor 10 is shown. Other embodiments are possible and contemplated. As shown in FIG. 1, processor 10 includes a prefetch/predecode unit 12, a branch prediction unit 14, an instruction cache 16, an instruction alignment unit 18, decode unit 20, reservation station 22, functional unit 24, a load/store unit 26, a data cache 28, a register file 30, a reorder buffer 32, an MROM unit 34, a bus interface unit 37, and an L2 cache 39. It is noted that in various embodiments each of decode unit 20, reservation station 22, and functional unit 24 may include any number of independent units, since in a superscalar processor, there may be multiple pipelines each having respective decode units, reservation stations and functional units. Accordingly, in the illustrated embodiment, the functional unit 24 includes integer units 124a and 124b and a floating point (FPU) 124c. However, in other embodiments, other numbers of integer units and FPU 124c may be used.

Prefetch/predecode unit 12 is coupled to receive instructions from bus interface unit 37, and is further coupled to instruction cache 16 and branch prediction unit 14. Similarly, branch prediction unit 14 is coupled to instruction cache 16. Still further, branch prediction unit 14 is coupled to decode units 20 and functional units 24. Instruction cache 16 is further coupled to MROM unit 34 and instruction alignment unit 18. Instruction alignment unit 18 is in turn coupled to decode unit 20. Decode unit 20 is coupled to load/store unit 26 and to reservation station 22. Reservation station 22 is further coupled to respective functional units 24. Additionally, decode unit 20 and reservation station 22 are coupled to register file 30 and reorder buffer 32. Functional unit 24 is coupled to load/store unit 26, register file 30, and reorder buffer 32 as well. Data cache 28 is coupled to load/store unit 26 and to bus interface unit 37. Bus interface unit 37 is further coupled to L2 cache 39 and a bus. Finally, MROM unit 34 is coupled to decode unit 20.

Instruction cache 16 is a high-speed cache memory provided to store instructions. Instructions are fetched from instruction cache 16 and dispatched to decode units 20. In one embodiment, instruction cache 16 is configured to store up to 64 kilobytes of instructions in a 2 way set associative structure having 64 byte lines (a byte comprises 8 binary bits). Alternatively, any other desired configuration and size may be employed. For example, it is noted that instruction cache 16 may be implemented as a fully associative, set associative, or direct mapped configuration.

Instructions are stored into instruction cache 16 by prefetch/predecode unit 12. Instructions and/or data may be prefetched prior to the request thereof from instruction cache 16 or load/store unit 26 in accordance with a prefetch scheme. Instructions which may be directly decoded by decode unit 20 are referred to as "fast path" instructions. The remaining x86 instructions are referred to as MROM instructions, according to one embodiment. MROM instructions are instructions which are determined to be too complex for decode by decode units 20. MROM instructions are executed by invoking MROM unit 34. More specifically, when an MROM instruction is encountered, MROM unit 34 parses and issues the instruction into a subset of defined fast path instructions to effectuate the desired operation. MROM unit 34 dispatches the subset of fast path instructions to decode unit 20.

In the illustrated embodiment, processor 10 employs branch prediction to speculatively fetch instructions subsequent to conditional branch instructions. Branch prediction unit 14 is included to perform branch prediction operations. Decode unit 20 and functional unit 24 may provide update information to branch prediction unit 14. Decode unit 20 may detect branch instructions which were not predicted by branch prediction unit 14. Functional unit 24 executes the branch instructions and determines if the predicted branch direction is incorrect. The branch direction may be "taken," in which subsequent instructions are fetched from the target address of the branch instruction. Conversely, the branch direction may be "not taken," in which subsequent instructions are fetched from memory locations consecutive to the branch instruction. When a mispredicted branch instruction is detected, instructions subsequent to the mispredicted branch are discarded from the various units of processor 10. In an alternative configuration, branch prediction unit 14 may be coupled to reorder buffer 32 instead of decode units 20 and functional unit 24, and may receive branch misprediction information from reorder buffer 32. A variety of suitable branch prediction algorithms may be employed by branch prediction unit 14.

Instructions fetched from instruction cache 16 are conveyed to instruction alignment unit 18. As instructions are fetched from instruction cache 16, the corresponding predecode data is scanned to provide information to instruction alignment unit 18 (and to MROM unit 34) regarding the instructions being fetched. Instruction alignment unit 18 utilizes the scanning data to align an instruction to each unit of decode unit 20. In one embodiment, instruction alignment unit 18 aligns instructions from three sets of eight instruction bytes to decode unit 20.

Decode unit 20 is configured to decode instructions received from instruction alignment unit 18. Register operand information is detected and routed to register file 30 and reorder buffer 32. Additionally, if the instructions require one or more memory operations to be performed, decode unit 20 dispatches the memory operations to load/store unit 26. Each instruction is decoded into a set of control values for functional unit 24, and these control values are dispatched to reservation station 22 along with operand address information and displacement or immediate data which may be included with the instruction. In one particular embodiment, each instruction is decoded into up to two operations which may be separately executed by functional units 124a-124b.

Processor 10 supports out of order execution, and thus employs reorder buffer 32 to keep track of the original program sequence for register read and write operations, to implement register renaming, to allow for speculative instruction execution and branch misprediction recovery, and to facilitate precise exceptions.

The instruction control values and immediate or displacement data provided at the outputs of decode unit 20 are routed directly to respective reservation stations 22. In one embodiment, each unit of reservation station 22 is capable of holding instruction information (i.e., instruction control values as well as operand values, operand tags and/or immediate data) for up to six pending instructions awaiting issue to the corresponding functional unit.

Upon decode of a particular instruction, if a required operand is a register location, register address information is routed to reorder buffer 32 and register file 30 simultaneously. Those of skill in the art will appreciate that the x86 register file includes eight 32 bit real registers (i.e., typically referred to as EAX, EBX, ECX, EDX, EBP, ESI, EDI and ESP). In embodiments of processor 10 which employ the x86 processor architecture which is also referred to as the IA-32 architecture, register file 30 comprises storage locations for each of the 32 bit real registers. Additional storage locations may be included within register file 30 for use by MROM unit 34.

As noted earlier, reservation stations 22 store instructions until the instructions are executed by the corresponding functional unit 124a, 124b or 124c. An instruction is selected for execution if: (i) the operands of the instruction have been provided; and (ii) the operands have not yet been provided for instructions which are within the same reservation station 22 and which are prior to the instruction in program order. It is noted that when an instruction is executed by one of the units within functional unit 24, the result of that instruction is passed directly to any reservation station 22 that is waiting for that result at the same time the result is passed to update reorder buffer 32 (this technique is commonly referred to as "result forwarding"). An instruction may be selected for execution and passed to a functional unit 24 during the clock cycle that the associated result is forwarded. Reservation station 22 routes the forwarded result to the functional unit 24 in this case. In embodiments in which instructions may be decoded into multiple operations to be executed by functional unit 24, the operations may be scheduled separately from each other.

In one embodiment, each of the integer units 124a and 124b is configured to perform integer arithmetic operations of addition and subtraction, as well as shifts, rotates, logical operations, and branch operations. The operations are performed in response to the control values decoded for a particular instruction by decode unit 20. It is noted that FPU 124c may also be employed to perform floating point operations. As such, FPU 124c includes a floating point multiplier adder (FMA) unit 125. The FPU 124c may be operated as a coprocessor, receiving instructions from MROM unit 34 or reorder buffer 32 and subsequently communicating with reorder buffer 32 to complete the instructions. Additionally, integer units 124a and 124b may be configured to perform address generation for load and store memory operations performed by load/store unit 26. In one particular embodiment, integer units 124a and 124b may comprise an address generation unit for generating addresses and an execute unit for performing the remaining functions. The two units may operate independently upon different instructions or operations during a clock cycle.

As described in greater detail below, in one embodiment, FPU 124c includes an FMA unit 125 that may include alignment shifter control logic 210 that may detect an overshift during floating point operations faster than conventional floating point units. More particularly, in one embodiment, alignment shifter control logic 210 may detect an overshift by calculating an overshift value for an addend that will be added to another addend or to a product of two numbers, and then comparing the calculated value to a selected overshift threshold value. In various embodiments, the selected overshift threshold value is a base 2 number in a range of overshift values including a minimum overshift threshold value and a maximum overshift threshold value, and which has a largest number of a consecutive of bits that are zero beginning at a least significant bit. This selected overshift value should implement an overshift detection logic circuit with the fewest number of gate delays in one of the critical timing paths of the FMA unit 125.

Load/store unit 26 provides an interface between functional unit 24 and data cache 28. In one embodiment, load/store unit 26 may configured with a load/store buffer having storage locations for data and address information for pending loads or stores which have not accessed data cache 28 and another load/store buffer having storage locations for data and address information for loads and stores which have accessed data cache 28.

Data cache 28 is a high-speed cache memory provided to temporarily store data being transferred between load/store unit 26 and the main memory subsystem. In one embodiment, data cache 28 may be set associative structure. It is understood that data cache 28 may be implemented in a variety of specific memory configurations, including the set associative configuration, a fully associative configuration, a direct-mapped configuration, and any suitable size or other configuration.

In one particular embodiment of processor 10 employing the x86 processor architecture, instruction cache 16 and data cache 28 are linearly addressed and physically tagged. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. The physical address is compared to the physical tags to determine a hit/miss status.

Bus interface unit 37 may be configured to communicate between processor 10 and other components in a computer system via a system bus. For example, the bus may be compatible with the EV-6 bus developed by Digital Equipment Corporation. Alternatively, any suitable interconnect structure may be used including packet-based, unidirectional or bi-directional links, etc. Bus interface unit 37 may further communicate with L2 cache 39.

In one implementation, L2 cache 39 may be a second level cache storing both instructions and data. L2 cache 39 may be, for example, 256 kilobytes, 512 kilobytes, or 1 Megabyte in size. Other embodiments may use smaller or larger sizes. L2 cache 39 may employ direct mapped or set associative configurations.

It is noted that although the processor 10 of FIG. 1 is described as being a processor implemented in the x86 architecture, it is contemplated that in other embodiments, processor 10 may be implemented in any other architecture. In addition processor 10 may be implemented as part of a multicore processor, or as an embedded processor within an application specific integrated circuit (ASIC), or the like.

Figure 2:
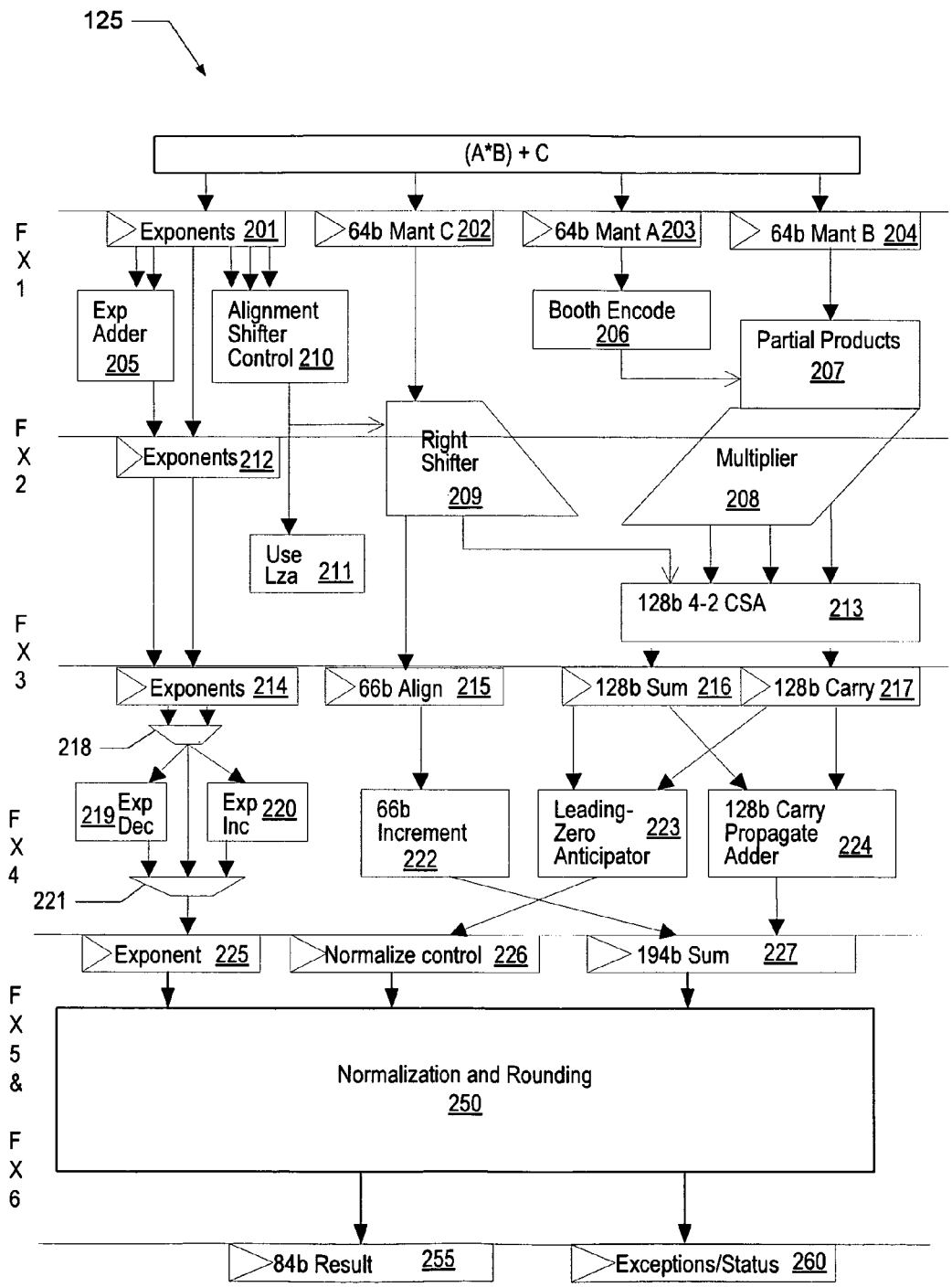
FIG. 2 is a block diagram of a portion of the embodiment of the floating point unit 124c of FIG. 1.

Referring to FIG. 2, a block diagram of a portion of one embodiment of the FMA unit 125 of FIG. 1 is shown. It is noted that various components have been omitted for simplicity and that only portions of the FMA unit 125 that are germane to the discussion are shown in FIG. 2. In the illustrated embodiment, the FMA 125 is shown as pipelined unit as indicated by the side headings FX1 through FX6, although it is contemplated that in other embodiments, a non-pipelined design may be implemented. It is also noted that the datapath provided by the depicted portion of FMA 125, is configured to handle normal cases. That is to say cases in which the MSB of the addend mantissa is always a logic value of one. Indeed, denormal cases in which the MSB of the addend mantissa is a zero, as well as cases which are all zero are handled by one or more different datapaths and corresponding circuits.

As shown, the FMA 125 includes a number of registers for storing the incoming addend 'C' and the multiplicands 'A' and 'B'. More particularly, the exponents of 'A' 'B' and 'C' may be stored within the register designated exponents 201, while the mantissas of the addend 'C' and the multiplicands 'A' and 'B' may be stored within the registers 202, 203 and 204, respectively as 64-bit values. In addition, the exponents register 201 is coupled to an exponents adder and alignment shifter control unit 210, as well as a second exponents register 212 in the next pipeline stage FX2. The exponents register 212 is coupled to an exponents register 214 in the next pipeline stage FX3, which is coupled to a multiplexer (mux) 218. The output of mux 218 is coupled to exponent decrementer 219, exponent incrementer 220 and one input of a mux 221. The output of the exponent decrementer 219 and the exponent incrementer 220 are each coupled to the other inputs of the mux 221. The output of mux 221 is coupled to an exponent register 225 at the start of pipeline stage FX5. The output of exponent register 225 may be used in the final calculations of the sum within the normalization and rounding unit 250 in pipeline stage FX6, which produces the final result and stores that result in a result register 255. The normalization and rounding unit 250 may also store any exceptions and/or status bits within an exceptions/status register 260.

Referring back up to stage FX1, the output of the mantissa register 203 is coupled to a booth encoder 206, which is coupled to one input of a partial products portion 207 of the multiplier 208. The output of the mantissa register 204 is coupled to the other input of the partial products portion 207 of the multiplier 208. The output of the multiplier 208 is coupled to the carry save adder (CSA) 213.

The output of the alignment shifter control 210 is coupled to provide an indication designated "Use Lza" 211 for using the leading zero anticipator unit 223. The output of the alignment shifter control 210 is also coupled to a right shifter unit 209 which is in turn coupled to the CSA 213 and to an align register 215, which may be configured to hold an aligned, shifted addend 'C'. The output of the align register 215 is coupled to an incrementer 222 which is coupled to a 194-bit sum register 227, whose output is coupled to the normalization and rounding unit 250.

Referring back to stage FX3, the output of the CSA 213 is coupled to a sum register 216 and to a carry register 217, which are both in turn coupled to the leading zero anticipator 223 and a carry propagate adder 224. The output of the leading zero anticipator 223 is coupled to the normalization control register 226, while the output of the carry propagate adder 224 is coupled to the sum register 227.

As mentioned above, during operation, depending on the value of the exponents of the product of 'A' and 'B' (i.e. product value), and the exponent of the addend 'C', the mantissa of the addend 'C' (i.e., addend value) may need to be shifted so that the exponents of the product value and the addend value are the same, for the subsequent addition operation. Accordingly, the alignment shifter control 210 may calculate the appropriate shift value and provide that to the right shifter 209. In addition, the alignment shifter control 210 may determine whether the calculated shift value will generate and undershift, or an overshift, as described in greater detail below in conjunction with the description of FIG. 3 and FIG.

4. Further, if the alignment shifter control 210 determines that an overshift has occurred, the alignment shifter control 210 may cause a sticky bit to be set.

Figure 3:
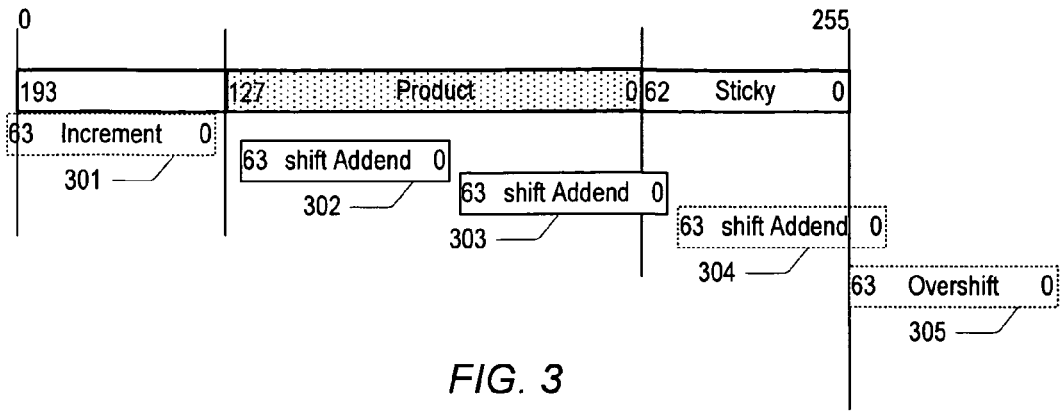
FIG. 3 is a diagram depicting a number of addend shifts of varying lengths.

FIG. 3 is a diagram depicting a number of addend shifts of varying lengths. Referring collectively to FIG. 2 and FIG. 3, the embodiment shown in FIG. 2 supports 64-bit mantissa values. Accordingly, the product would be 128 bits. As shown in FIG. 3, the 66 bits to the left of the product are referred to as an increment region because when the addend and product are summed, the effect on the bits in that region is to add at most one unit. The 63 bits to the right of the product are referred to as the sticky region. The sticky region refers to the area which, if the addend is shifted such that any addend bits overlap the sticky region, those bits are logically OR-ed together to generate a sticky bit that may be used in rounding operations. The width of the sticky region may be defined as the mantissa width (Mw) minus one.

As described above, before adding the addend to the product, the addend may need to be shifted such that the product and addend exponents are the same. In practice, the shift amounts may be confined to shifts where at least one bit of the shifted addend overlaps with the product, plus a few bits needed as guard banding for addends aligned to the left (more significant) than the product. In this example embodiment guard bits (Gb) is chosen to be 2.

Accordingly, when adding a 64-bit addend to a 128-bit product (e.g., two 64-bit mantissa multiplicands) a shift of zero would leave the addend with its bits in the range of 126:63, such as shown by addend 302 in FIG. 3. A left shifted addend would be limited to a 67-bit shift, such that there are two guard bits between the LSB of the addend and the MSB of the product. Beyond that, an undershift condition would exist such that none of the addend bits align with the product bits as shown by undershift addend 301 in FIG. 3. In practice it is considered simpler to shift in only one direction. A constant may be added to bias the shift amount so that an undershift is encoded as a shift of zero and the shifter always shifts to the right. For example addend 302, where addend exponent is equal to the exponent of the product, would result in a right shift of 67. All references to shift amounts hereinafter refer to this biased representation.

An addend shifted right by more than 2Mw+Gb but within a shift boundary is shown by shift addend 303, in which some of the bits of the shifted addend 303 are within the product and some are in the sticky range. The shift boundary may be defined as, for example, 3Mw+Gb−1. This shift boundary is 193 for the example datapath and is the maximum right shift since such a shift would allow the MSB of the addend to be aligned with the LSB of the product. Note that the sticky range must include at least Mw−1 bits so that for this maximum right shift all the mantissa bits below the product LSB are included in the sticky. A right shift greater than the maximum is considered an overshift. Because the MSB of the addend is always 1, any overshift results in sticky being set.

However, since the MSB of the addend is always a one in this implementation, and because zeros and denormals are handled in a different datapath, shift values which place the addend MSB in the sticky range will correctly set the sticky bit irrespective of the overshift indication overshift because the addend MSB will cause the normal sticky logic to set the sticky indication. Accordingly, rather than computing the overshift at the exact boundary (shift amount greater than maximum right shift) the overshift detection circuit may be built using an overshift threshold value selected anywhere between a the minimum and maximum overshift threshold. The minimum overshift threshold may be represented as the shifter width, which in this fused multiply implementation is Gb+3Mw. The maximum overshift threshold is 4Mw+Gb−2, or simply 4(Mw) for Gb=2. It is noted that in a pure adder the minimum overshift threshold may be represented as Gb+2Mw, and the maximum overshift threshold would be 3Mw+Gb−2. For the 64-bit FMA implementation in FIG. 3, the minimum and maximum overshift thresholds are 194 and 256, respectively.

In the illustrated embodiment, the overshift threshold is selected to be 256 or more as depicted by overshift addend 305, since as described further below, the logic to implement the overshift detection may have fewer logic levels and thus fewer gate delays. When such an overshift condition exists as shown, the sticky bit is forced to be set since there are no addend bits left in the sticky range to logically OR.

Figure 4:
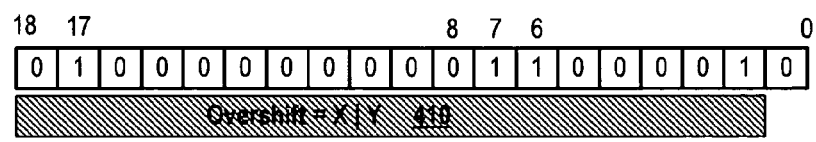
FIG. 4 is a diagram depicting an overshift detection logic simplification realization.
Figure 4:
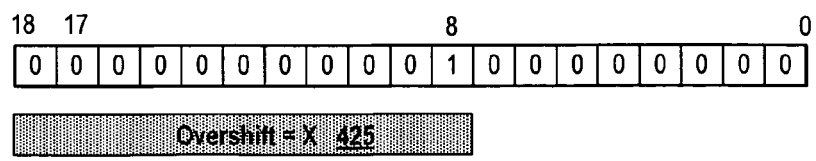

Referring to FIG. 4, a diagram depicting an overshift detection logic simplification realization based upon the shifting shown in FIG. 3 is shown. As described above, the right shift amount (i.e., shift value) may be calculated as shown. In the illustrated embodiment, the exponents are represented as 18-bit unsigned numbers (e.g., ExpA[17:0]), however the shift value accounts for undershift values which are negative, thus the shifter includes an additional sign bit S[18]. To detect an overshift, the detection logic compares the shift amount to an overshift threshold. In the conventional system, the overshift threshold value was >=194. In the present embodiment, the overshift threshold value is >=256. The depiction in FIG. 4 illustrates the bits that must be checked to detect a shift value >=194 as depicted by overshift 410 and to detect a shift value >=256 as depicted by overshift 425.

For example, two numbers X and Y are defined as shown. The X value would evaluate to be true if the sign bit was a logic value of zero, and any of bits [17:8] were a logic value of one. The Y value would evaluate to be true if the sign bit were a logic value of zero, and bit 7 and bit 6 were both logic values of one, and at least one of bits [5:1] were a logic value of one. Accordingly, to detect an overshift condition of >=194, the logical OR operation of X and Y must be realized. However, to detect an overshift condition of >=256, only the number X must be realized. Thus, to detect >=256 fewer bits may be compared and the logic to compare them has fewer logic levels and thus fewer timing path delays.

As another example, in a system that supports a 24-bit datapath and thus 24-bit mantissas and 2 guard band bits, an overshift threshold value in the range 74 and 96 may be selected, where the number 74 comes from Gb+3Mw (e.g., 2+3(24)) and the number 96 comes from 4Mw (e.g., 4(24). Accordingly, in an implementation using the above technique, selecting the overshift threshold value to be >=96 may yield the fewest logic levels and thus the smallest number of gate delays in the overshift detection timing path.

Conversely, in yet another example in which a 53-bit datapath is used, the maximum overshift threshold value may not be the optimum choice. In this example, the overshift threshold range would be >=161 and >=212. In this example, an overshift value of 212 does not provide the optimum logic level implementation. Indeed it can be shown that >=192 would provide the fewest gate delays in the critical timing path of the overshift detection logic over the other selections in the range, since 192 has more consecutive zeros in the bit positions starting at the LSB and moving left to the first bit position with a one.

Thus, an overshift threshold value may be selected that is between the minimum and a the maximum overshift thresholds and which has a largest number of a consecutive of bits that are zero beginning at the LSB of the value. More particularly, in the above example using 161 and 212 as the minimum and maximum overshift threshold values, $212_d$ corresponds to $11010100_b$, while $192_d$ corresponds to $11000000_b$.

It is noted that although the above embodiments are described in the context of a multiplier adder, it is contemplated that in other embodiments the overshift detection logic may be implemented in any floating-point adder. In such embodiments, there would be two addends instead of a product and an addend, and as mentioned above, the shifter width would be Gb+2(Mw), and the maximum overshift threshold would be 3(Mw).

It is further noted that the floating-point unit described above may be implemented in any type of processing unit capable of performing floating point functionality.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A floating point unit comprising:
   a floating point adder configured to perform a floating point addition operation between a first floating point number having a first exponent and a first mantissa, and a second floating point number having a second exponent and a second mantissa; and
   a shifter unit coupled to the floating point adder and configured to shift the second mantissa such that the second exponent value is the same as the first exponent value;
   an alignment shifter coupled to the shifter unit and configured to calculate a shift value corresponding to a number of bit positions to shift the second mantissa;
   wherein the alignment shifter is configured to detect an overshift condition, in which the shift value is greater than or equal to a selected overshift threshold value;
   wherein the alignment shifter is further configured to provide an overshift indication in response to detecting the overshift condition; and
   wherein the selected overshift threshold value comprises a base 2 number in a range of overshift values including a minimum overshift threshold value and a maximum overshift threshold value, and which has a largest number of a consecutive of bits that are zero beginning at a least significant bit.

2. The floating point unit as recited in claim 1, wherein the alignment shifter is configured to shift to the right, the second mantissa the number of bit positions indicated by the shift value.

3. The floating point unit as recited in claim 1, wherein the minimum overshift threshold value corresponds to a shift value resulting from the second mantissa being shifted to the right such that the MSB of the second mantissa is to the right of the LSB of the first mantissa and which corresponds to a number of guard band bits added to twice a number of bits in a datapath of the first mantissa.

4. The floating point unit as recited in claim 1, wherein a number of bits to the right of a least significant bit (LSB) of the first mantissa corresponds to a sticky region, wherein the sticky region includes a number of bits equal to one less than a number of bits in a datapath of the first mantissa.

5. The floating point unit as recited in claim 4, wherein in response to the second mantissa being shifted to the right such that any of the LSBs of the second mantissa that are to the right of the LSB of the first mantissa are logically OR-ed together to generate a sticky bit.

6. The floating point unit as recited in claim 5, wherein the alignment shifter is further configured to cause the sticky bit to be set in response to detecting the overshift condition.

7. The floating point unit as recited in claim 5, wherein the maximum overshift threshold value corresponds to a shift value resulting from the second mantissa being shifted to the right such that the MSB of the second mantissa is aligned with the LSB of the sticky region.

8. The floating point unit as recited in claim 1, further comprising a floating point multiplier/adder configured to multiply a third floating point number by a fourth floating point number to create a product value, and to add a fifth floating point number to the product value, wherein the product value includes a product exponent and a product mantissa and the fifth floating point number includes a third exponent value and a third mantissa.

9. The floating point unit as recited in claim 8, wherein the alignment shifter is further configured to calculate a second shift value corresponding to a number of bit positions to shift the third mantissa such that the third exponent value is the same as the product exponent value.

10. The floating point unit as recited in claim 9, wherein the minimum overshift threshold value corresponds to a number of guard band bits added to three times a number of bits in a datapath of the third mantissa.

11. The floating point unit as recited in claim 9, wherein a number of bits to the right of a least significant bit (LSB) of the product mantissa corresponds to a sticky region, wherein the sticky region includes a number of bits equal to one less than a number of bits in a datapath of the third mantissa.

12. The floating point unit as recited in claim 11, in response to the third mantissa being shifted to the right such that any of the LSBs of the third mantissa that are to the right of the LSB of the product mantissa are logically Or-ed together to generate a sticky bit.

13. The floating point unit as recited in claim 11, wherein the maximum overshift threshold value corresponds to a shift value resulting from the third mantissa being shifted to the right such that the MSB of the third mantissa is aligned with the LSB of the sticky region.

14. The floating point unit as recited in claim 1, wherein the selected overshift threshold value corresponds to a logic implementation having a fewest number of gate delays in a detection critical timing path for a comparison between the shift value and the selected overshift threshold value.

15. A processor comprising:
   a floating point unit configured to perform floating point operations, wherein the floating point unit includes:
      a floating point adder configured to perform a floating point addition operation between a first floating point number having a first exponent and a first mantissa, and a second floating point number having a second exponent and a second mantissa; and
      an alignment shifter configured to calculate a shift value corresponding to a number of bit positions to shift the second mantissa such that the second exponent value is the same as the first exponent value;
      wherein the alignment shifter is configured to detect an overshift condition, in which the shift value is greater than or equal to a selected overshift threshold value;
      wherein the alignment shifter is further configured to provide an overshift indication in response to detecting the overshift condition; and
      wherein the selected overshift threshold value comprises a base 2 number in a range of overshift values including a minimum overshift threshold value and a maximum overshift threshold value, and which has a largest number of a consecutive of bits that are zero beginning at a least significant bit.

16. The processor as recited in claim 15, wherein the alignment shifter is configured to shift to the right, the second mantissa the number of bit positions indicated by the shift value.

17. The processor as recited in claim 15, wherein the minimum overshift threshold value corresponds to a shift value resulting from the second mantissa being shifted to the right such that the MSB of the second mantissa is to the right of the LSB of the first mantissa and which corresponds to a number of guard band bits added to twice a number of bits in a datapath of the first mantissa.

18. The processor as recited in claim 15, wherein a number of bits to the right of a least significant bit (LSB) of the first mantissa corresponds to a sticky region, wherein the sticky region includes a number of bits equal to one less than a number of bits in a datapath of the first mantissa.

19. The processor as recited in claim 18, wherein in response to the second mantissa being shifted to the right such that any of the LSBs of the second mantissa that are to the right of the LSB of the first mantissa are logically OR-ed together to generate a sticky bit.

20. The processor as recited in claim 19, wherein the alignment shifter is further configured to cause the sticky bit to be set in response to detecting the overshift condition.

* * * * *